Sept. 22, 1931.　　　G. B. WELSER, JR　　　1,824,756
CONVEYER
Filed Oct. 24, 1927　　　3 Sheets-Sheet 1
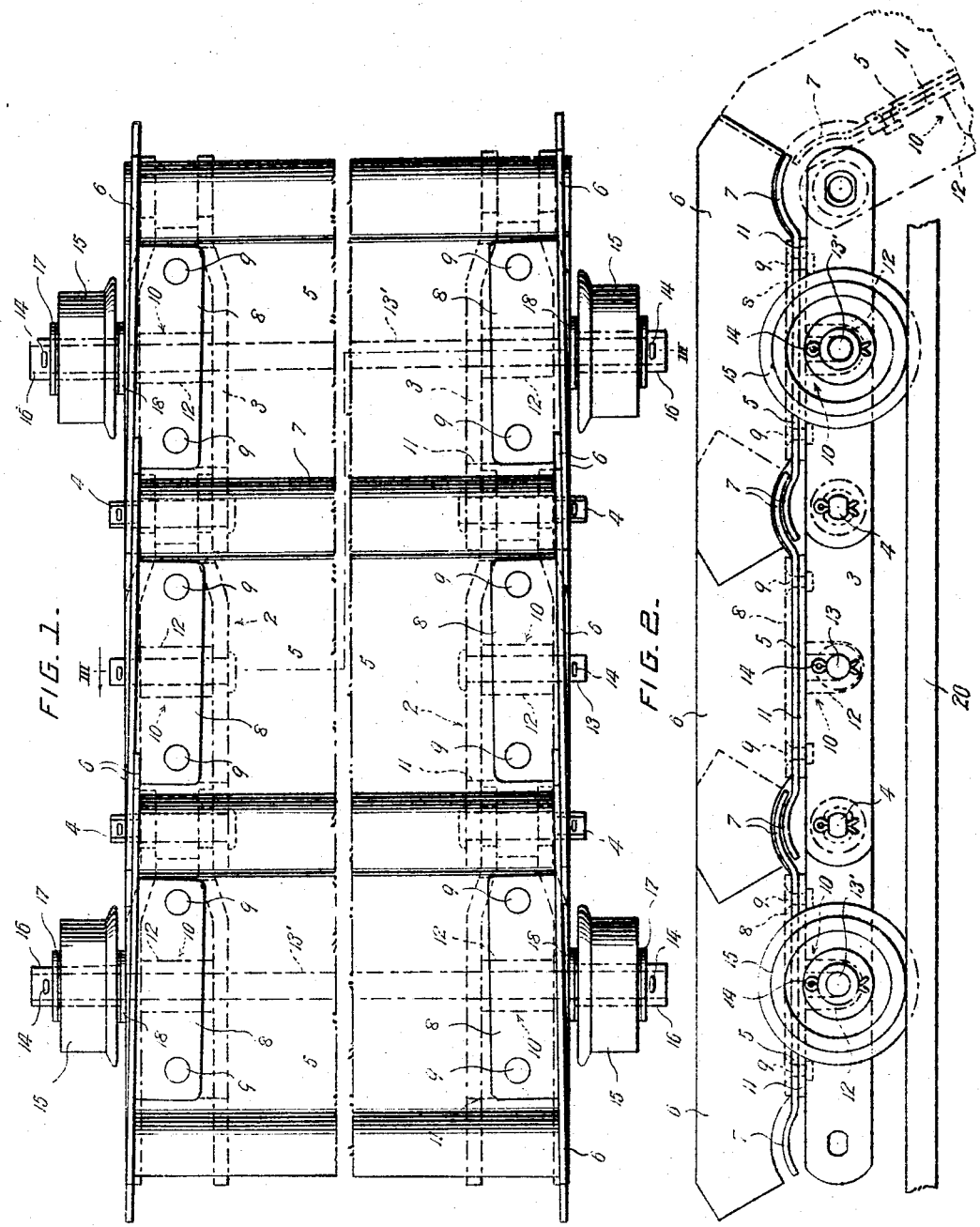

Sept. 22, 1931.  G. B. WELSER, JR  1,824,756
CONVEYER
Filed Oct. 24, 1927  3 Sheets-Sheet 2

Inventor
George B. Welser Jr
By John S. Barker
his Attorney

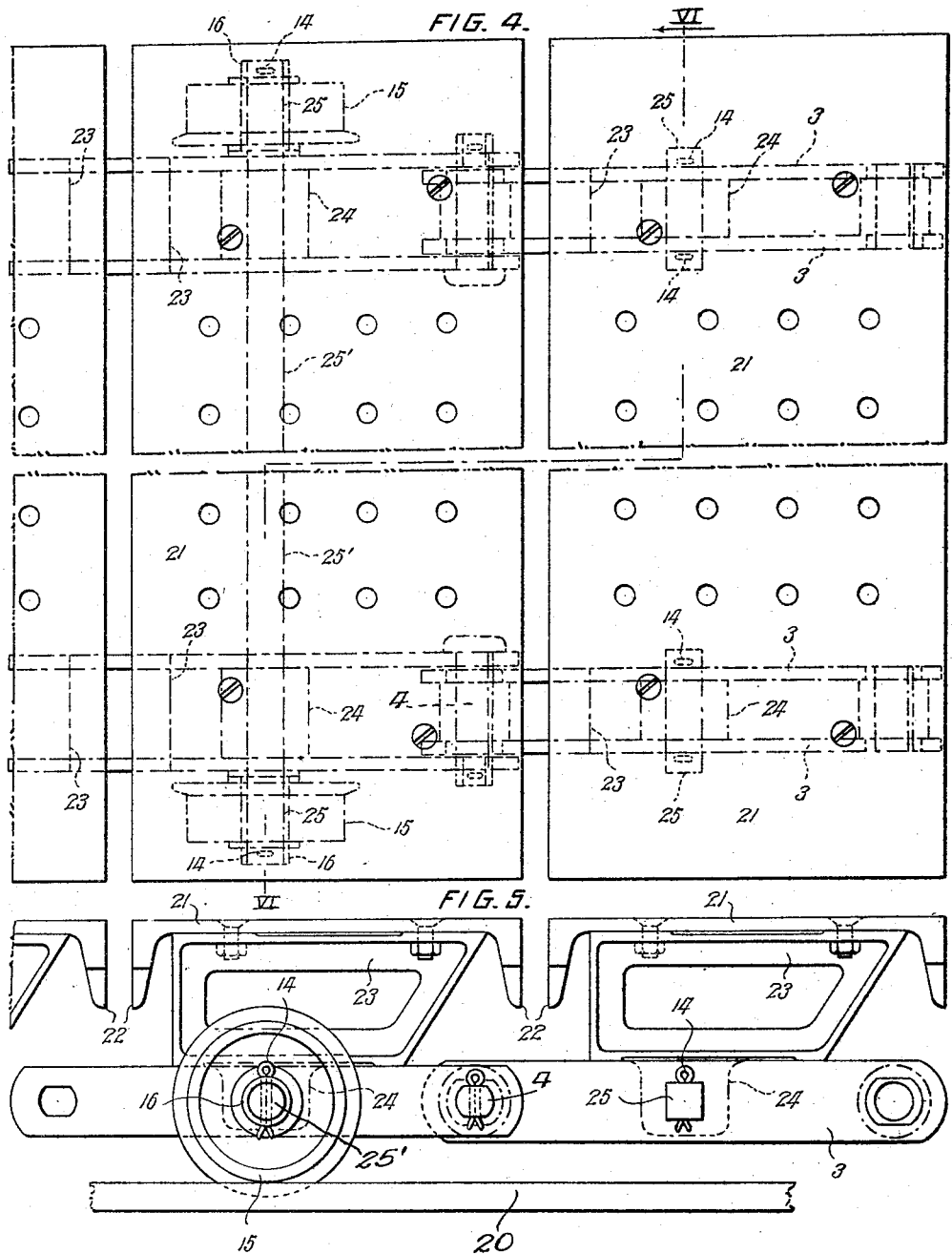

Patented Sept. 22, 1931

1,824,756

UNITED STATES PATENT OFFICE

GEORGE B. WELSER, JR., OF MILWAUKEE, WISCONSIN, ASSIGNOR TO CHAIN BELT COMPANY, OF MILWAUKEE, WISCONSIN, A CORPORATION OF WISCONSIN

CONVEYER

Application filed October 24, 1927. Serial No. 228,308.

My invention relates to endless conveyers in which the draft or tension members that impart movements to the carrying or transporting parts are sprocket chains. The invention is particularly (though not exclusively) adapted for use in connection with pan conveyers, apron conveyers, platform conveyers, bucket elevators and the like, in which the supporting and transporting elements, when actually functioning, usually run along a path approximating the horizontal, or along inclines less than 70°, and in which two or more parallel lines of chains are employed to carry the transporting elements of the conveyer. In such conveyers it is necessary, or highly desirable, to provide means other than the chains for supporting the conveyer between the sprocket wheels with which it engages, and for this purpose the usual practice is to employ rollers or wheels that travel along the tracks that parallel the course of the conveyer. It is common practice to support these rollers upon the pintles or rods that constitute the axles that unite the separate links of the chain and about which they articulate. Where the rollers serve as supports for the conveyer on its inactive or return run as well as upon the active or working run, the axles uniting the chain links are frequently lengthened and serve as through rods connecting the parallel lines of chains and maintaining their joints in alignment, such rods being extended beyond the sides of the conveyer to there constitute the bearings or supports for the rollers, which become outboard rolling supports. Outboard supports for the conveyer have likewise been secured by attaching the axles for the rollers directly to the ends of the transporting elements of the conveyer. There are, however, disadvantages in arranging the outboard rolling supports for the conveyer in both of the ways described, some of which will be later referred to.

It is the purpose of my invention to provide a sprocket chain-driven conveyer with outboard supporting rollers, that has none of the disadvantages that have heretofore been incident to conveyers of this type; and also to produce a pan conveyer, or one of similar type, in which the elements for conveying or moving material in bulk are connected with the chains or tension members of the conveyer in a novel manner.

Referring to the drawings, Fig. 1 is a broken plan view of a conveyer embodying one form of my invention.

Fig. 2 is a side elevation of the portion of conveyer shown in Fig. 1.

Fig. 4 is a plan view of a section of a conveyer illustrating the invention embodied in a different form from that shown in Fig. 1.

Fig. 5 is a side view of the conveyer shown in Fig. 4.

Figure 3:
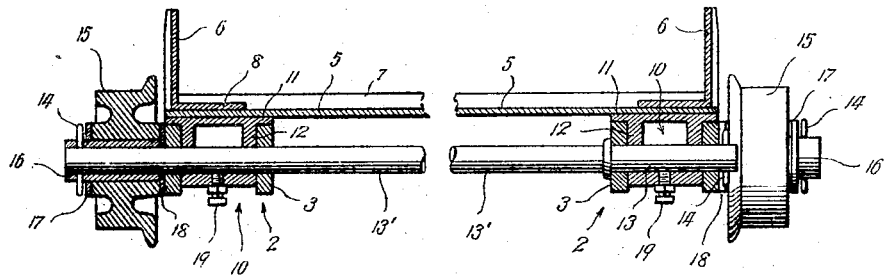
Fig. 3 is a transverse sectional view on the line III—III of Fig. 1.

Referring particularly to Figs. 1 to 3 of the drawings, 2, 2 indicate pintle-connected sprocket chains that are parallel to each other and are arranged to engage with drive and idle sprocket wheels in the usual manner, such wheels not being represented in the drawings. These chains may be of any suitable or preferred construction, those represented comprising spaced apart side bars 3 and connecting pintles 4.

The supporting and transporting elements of the conveyer are in the form of pans with bottoms 5 and sides 6. The latter are provided along their bottom edges with flanges 8 that overlap the edges of the bottoms and are secured thereto, as by bolts 9. The ends 7 of the bottoms of the pans overlap and are curved on arcs concentric with the axes of the adjacent joints of the chains; and the ends of the sides of the pan also overlap. This arrangement insures that at the points of articulation of the elements of the conveyer there shall be no open joints permitting the escape of material being transported.

There are secured fast to the bottoms of the pans, near their opposite edges, the saddles 10, each consisting of a top plate 11, and a perforated lug 12. The top plates of the saddles rest upon the upper edges of the side bars of the chains and the perforated lugs lie between such side bars preferably occupying positions midway between the ends of the links to which they are united. The bolts 9 employed to unite the sides and bottoms of the pans also pass through perforations in the top plates 11 of the saddles, thus securing the latter to the pans. The saddles are secured to the chains by pins 13 that pass through the perforations in the lugs and through perforations formed in the side bars of the links, and these connecting pins are held in place by cotter pins 14. I prefer that the connecting pins 13 should be secured fast to the saddles by set screws 19 seated in the lugs 12 of the saddles, or by through pins instead of set screws. The connecting pins that unite the saddles with the chains may be lengthened to constitute through bars 13′ extending from one chain to the other and uniting them, and continued outwardly beyond the sides 6 of the pans to serve as supports for the outboard rollers or wheels 15 that are adapted to run upon tracks 20 paralleling the course of the chains. I prefer that the rollers should be supported upon hardened steel bushings 16 interposed between hubs of the rollers and the rods 13′, and that washers 17, 18, should be employed at the ends of the hubs, the former, 17, being perforated to surround the bushing 16 and located between the outer ends of the roller hubs and the cotter pins 14, and the latter, 18, perforated to fit the through rods 13′ and located between the inner ends of the roller hubs and the adjacent side bars of the chain.

It will be seen that the method of constructing the conveyer as described insures that the pans or other transporting elements of the conveyer are equally supported by the outer and inner side bars of the chains, since they rest directly upon both such side bars, thus avoiding putting of eccentric loads upon the chains, as is the case when the conveying elements are secured to or rest upon the inner side bars only of the chains, as has heretofore frequently been the practice. This eccentric loading of the chains has been found to very much increase the wear upon the chains, experience showing that the life of the chain is reduced approximately one-half when thus eccentrically loaded.

Another advantage, incident to the construction described and growing out of the mounting of the rollers 15 upon axles that are independent of and located between connecting pintles 4 that unite the chain links, is that when the invention is used on a conveyer that moves along an inclined path and a replacement is to be made upon an incline, this is possible and entirely practicable without disturbing the chains, which remain intact, holding together the parts of the conveyer as a whole; for it being well understood that if a connecting pintle be removed from a portion of a chain upon an incline that part of the chain below such removal will tend to run down the incline, unless restrained by some extraneous means. But with my invention the rollers 15 may be easily removed for replacement without disturbing other elements of the chain, and this is very important because when bulk material is transported horizontally or nearly so by means of pan conveyers the wear upon the supporting rollers and their bearings is greater than is the wear upon the joints of the chain and replacements of such supporting wheels or rollers have to be frequently made.

The connections between the saddles 10 and the chains may be and preferably are somewhat loose or slack with the advantage that the pans or other transporting elements may have a certain amount of give-and-take relative to the chains, notwithstanding the fact that through rods may be used to unite the opposite and parallel chains. In a chain made according to my invention practically the only purpose of the rods is to give a convenient and proper support for the out-board rollers 15 of the conveyer. On the other hand, when the through rods are used and are arranged to serve also as the pivots 4 uniting the links of the chain, the joints at the chain connections must have very close working fit in order to resist the effects of eccentric loading of the chains with the result that the conveyer itself is stiff and rigid so far as the advancement of one part relative to the other is concerned; and the same is true where the transverse carrying elements of the conveyers, such as the pans, are rigidly secured to the inner links of the chains.

It frequently happens in operating pan and similar conveyers that a piece of metal, rock, or other hard substance, will come between the tooth of a driving sprocket wheel and a link of the chain about to engage therewith, with the result that the particular link where this occurs cannot closely engage with the sprocket, and the chain, of which that particular link is a part, is thrown out of alignment with the opposite chain. When this occurs, if the chain is rigid as just described, severe strains are thrown upon the conveyer; but where the through rods have loose or slack connection with the sprocket chains, and where the connections of the transverse transporting elements with the chains are also loose—and this looseness need be very slight—then one of the chains may momentarily advance ahead of the other without injury to or severe strain upon the conveyer.

Figure 6:
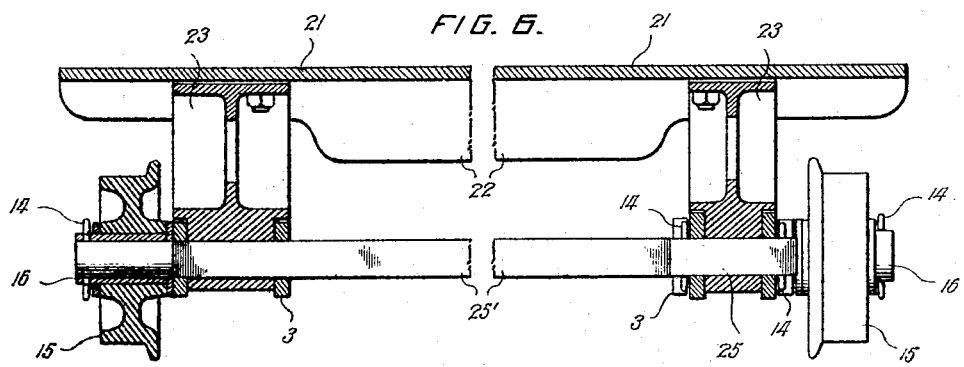
Fig. 6 is a transverse sectional view taken on the line VI—VI of Fig. 4.

In Figs. 4 to 6 there is illustrated a form of apron or platform conveyer differing from the conveyer illustrated in Figs. 1 to 3. Referring to these views, where similar reference characters are employed for identical parts found in other constructions herein described, it will be seen that the carrying elements are platforms 21 formed of channel plates with transverse flanges 22 along their adjacent edges. That platforms 21 are supported upon saddles consisting each of a block 23 that rests upon and rises considerably above the sidebars of a chain link, such block being formed with a perforated lug 24, adapted to lie between the said sidebars and be connected thereto by a pin 25. The pin 25 is square, fitting correspondingly shaped openings in the sidebars 3 of the links and the lug 24 of the saddle. Certain, or all, if this should be found desirable, of the connecting pins may be extended to constitute through bars or shafts 25'; and when thus extended the ends of the bars 25' that project beyond the chains are made cylindrical to receive the bushings 16 on which the rollers 15 turn. In this form of my invention it will be seen, by reference to Fig. 4, that while the platforms 21 overlie the rollers 15, these are nevertheless outboard rollers with reference to the chains of the conveyer.

It will be observed that the following features are common to each form of my invention: the connections of the transporting elements of the conveyer with the sprocket chains are quite independent of the pivotal connections uniting together the links of the chains, and are preferably midway between such pivotal connections; the connections between the transporting and the draft elements of the conveyer are such that the links of the chain are not eccentrically loaded, that is to say the connections are such that each sidebar of each link bears its own proportion of the load; the connections between the chains and transporting elements are sufficiently slack to allow one chain to momentarily and slightly advance relative to the other chain without undue strain, and any one of the transporting or conveying elements and any one of the outboard supporting rollers may be easily removed from the conveyer without disturbing other parts.

What I claim is:

1. A conveyer comprising parallel lines of sprocket chains formed of links having separated sidebars, and being pintle-connected, transversely arranged means for transporting material, such means being supported equally by both sidebars of the links that are arranged opposite each other in the lines of sprocket chain, and pins connecting the transporting means of the conveyer to links of the chains, such connections being slack.

2. A conveyer comprising parallel lines of sprocket chains formed of links having separated sidebars, and being pintle-connected, transversely arranged elements for transferring material, such transfer elements being each supported equally by both sidebars of links that are arranged opposite each other in the lines of the sprocket chains and to which they are connected, and being provided with lugs that lie between such sidebars, pins passing through the said lugs and side-bars thus connecting the transfer elements to the chains, such connections being slack, some of the pins being lengthened to constitute through axles uniting the opposite chains, and rollers supported on the said through axles outside the lines of the chain.

3. A conveyer comprising parallel lines of sprocket chains formed of pintle connected links, each of which is provided with identical spaced apart side bars; transversely extending material-transferring elements resting upon both side bars of each complementary pair of links of said chains, said elements forming a continuous platform-like means for transporting material; lugs carried by each transfer element extending between the spaced side bars of said complementary pairs of links; and removable pins intermediate the chain pintles, providing slack connections between said lugs and said spaced side bars.

4. A conveyer comprising parallel lines of sprocket chains formed of pintle connected links, each of which is provided with identical spaced apart side bars; a saddle carried by each link, having a head bridging the space between and resting upon said spaced side bars, and a lug extending between said bars; removable pins passing through said side bars intermediate the chain pintles and providing slack connections with said lugs; and material transferring elements bridging the space between and secured to complementary saddle heads.

5. A load carrying continuous platform-like conveyer adapted to transfer heavy and abrasive material, the elements of which are—parallel lines of sprocket chains formed of pintle-connected links, each of which comprises spaced apart side bars; material-transporting elements extending between the parallel lines of chains and supported equally by both side bars of each complementary pair of links of said chains; lugs carried by each transfer element extending between the spaced side bars of said complementary pairs of links; short connecting pins passing through the side bars of complementary pairs of links and through said lugs uniting alternate transfer elements to the chains; through rods extending from chain to chain and passing through complementary pairs of links in said chains and through lugs carried by transfer elements located between those connected with the chains by the aforesaid short pins, the said short pins and through rods constituting slack connections between the lugs and chain links and load-carrying rollers supported upon the said through rods outside the complementary pairs of links to which the rods connect the transfer elements.

GEORGE B. WELSER, Jr.